United States Patent
Pereira et al.

(10) Patent No.: US 9,135,695 B2
(45) Date of Patent: Sep. 15, 2015

(54) METHOD FOR CREATING ATTENUATION CORRECTION MAPS FOR PET IMAGE RECONSTRUCTION

(71) Applicants: Francisco Pereira, Princeton, NJ (US); Helene Chopinet, Bourg-la-Reine (FR); James G. Reisman, Princeton, NJ (US); Christophe Chefd'hotel, Jersey City, NJ (US)

(72) Inventors: Francisco Pereira, Princeton, NJ (US); Helene Chopinet, Bourg-la-Reine (FR); James G. Reisman, Princeton, NJ (US); Christophe Chefd'hotel, Jersey City, NJ (US)

(73) Assignee: Siemens Aktiengesellschaft, Munich (DE)

( * ) Notice: Subject to any disclaimer, the term of this patent is extended or adjusted under 35 U.S.C. 154(b) by 185 days.

(21) Appl. No.: 13/717,988

(22) Filed: Dec. 18, 2012

(65) Prior Publication Data

US 2013/0266198 A1   Oct. 10, 2013

Related U.S. Application Data

(60) Provisional application No. 61/620,073, filed on Apr. 4, 2012, provisional application No. 61/644,029, filed on May 8, 2012.

(51) Int. Cl.
  *G06T 7/00* (2006.01)
  *G06T 5/00* (2006.01)
  *G06T 5/50* (2006.01)

(52) U.S. Cl.
  CPC .............. *G06T 7/0012* (2013.01); *G06T 5/008* (2013.01); *G06T 5/50* (2013.01); *G06T 2207/10088* (2013.01); *G06T 2207/10104* (2013.01); *G06T 2207/30016* (2013.01)

(58) Field of Classification Search
  CPC ...................................................... G06T 7/0012
  USPC ........................................................ 382/131
  See application file for complete search history.

(56) References Cited

U.S. PATENT DOCUMENTS

| 7,596,256 | B1 * | 9/2009 | Arie et al. | 382/131 |
|---|---|---|---|---|
| 2004/0030246 | A1 * | 2/2004 | Townsend et al. | 600/427 |
| 2006/0058641 | A1 * | 3/2006 | Krieg et al. | 600/416 |
| 2008/0014149 | A1 * | 1/2008 | Murthy et al. | 424/9.36 |
| 2008/0117209 | A1 * | 5/2008 | Razeto | 345/424 |
| 2009/0310746 | A1 * | 12/2009 | Ye et al. | 378/62 |
| 2010/0004909 | A1 * | 1/2010 | Nitz | 703/4 |
| 2010/0021034 | A1 * | 1/2010 | Lenglet et al. | 382/131 |
| 2010/0049032 | A1 * | 2/2010 | Steinke et al. | 600/416 |
| 2010/0061610 | A1 * | 3/2010 | Van De Haar | 382/131 |
| 2011/0007959 | A1 * | 1/2011 | Schulz et al. | 382/131 |
| 2011/0123083 | A1 * | 5/2011 | Ojha et al. | 382/131 |
| 2011/0286649 | A1 * | 11/2011 | Reisman et al. | 382/131 |
| 2011/0317900 | A1 * | 12/2011 | Pal et al. | 382/131 |
| 2012/0093381 | A1 * | 4/2012 | Fan et al. | 382/131 |
| 2012/0288174 | A1 * | 11/2012 | Dale et al. | 382/131 |

(Continued)

OTHER PUBLICATIONS

X. Artaechevarria, A. Muñoz-Barrutia, and C. Ortiz-De Solórzano. "Combination Strategies in Multi-atlas Image Segmentation: Application to Brain MR Data", IEEE Transactions on Medical Imaging, 2009, pp. 1266-1277, vol. 28(8).

(Continued)

*Primary Examiner* — Barry Drennan
*Assistant Examiner* — Delomia Gilliard

(57) ABSTRACT

A method (100) that generates attenuation correction maps for the reconstruction of PET data using MR images, such as, MR ultra-fast TE (UTE) images, Dixon MR images, as well as MR images obtained using other MR imaging methods.

25 Claims, 7 Drawing Sheets

(56) References Cited

U.S. PATENT DOCUMENTS

| | | |
|---|---|---|
| 2013/0077840 A1* | 3/2013 | Blumfield et al. ............ 382/131 |
| 2013/0083987 A1* | 4/2013 | Novak et al. ................. 382/131 |
| 2013/0094732 A1* | 4/2013 | Chabanas et al. ............ 382/128 |
| 2013/0101193 A1* | 4/2013 | Ra et al. ....................... 382/131 |
| 2013/0129168 A1* | 5/2013 | Ross ............................. 382/128 |
| 2013/0172727 A1* | 7/2013 | Mori et al. .................... 600/407 |
| 2014/0133728 A1* | 5/2014 | Blaffert et al. ............... 382/131 |

OTHER PUBLICATIONS

P. Coupé, J. V. Manjón, V. Fonov, J. Pruessner, M. Robles, and D. L. Collins, "Patch-based Segmentation using Expert Priors: Application to Hippocampus and Ventricle Segmentation", NeuroImage, 2011, pp. 940-954, vol. 54(2).

D. V. Iosifescu, M. E. Shenton, S. K. Warfield, R. Kikinis, J. Dengler. F. A. Jolesz, and R. W. McCarley, "An Automated Registration Algorithm for Measuring MRI Subcortical Brain Structures", NeuroImage, 1997, pp. 13-25, vol. 6(1).

T. Rohlfing, R. Brandt, R. Menzel, D. B. Russakoff, and C. R. Maurer, Jr., "Quo Vadis, Atlas-based Segmentation?", Strategies, 2005, pp. 435-486, vol. 3(2).

T. Rohlfing, D. B. Russakoff, and C. R. Maurer, Jr., "Expectation Maximization Strategies for Multi-atlas Multi-label Segmentation", Information Processing in Medical Imaging Proceedings of the Conference, 2003, pp. 210-221, vol. 18.

F. Rousseau, P. A. Habas, and C. Studholme,"A Supervised Patch-based Approach for Human Brain Labeling", IEEE Transactions on Medical Imaging, 2011, pp. 1852-1862, vol. 30(10).

M. Sdika, "Combining Atlas Based Segmentation and Intensity Classification with Nearest Neighbor Transform and Accuracy Weighted Vote", Medical Image Analysis, 2010, pp. 219-226, vol. 14(2).

C. Svarer, K. Madsen, S. G. Hasselbalch, L. H. Pinborg, S. Haugbøl, V. G. Frøkjaer, S. Holm, O. B. Paulson, and G. M. Knudsen,"MR-based Automatic Delineation of Volumes of Interest in Human Brain Pet Images using Probability Maps", NeuroImage, 2005, pp. 969-979, vol. 24(4).

H. Zaidi and B. Hasegawa, "Determination of the Attenuation Map in Emission Tomography", The Journal of Nuclear Medicine, Official Publication Society of Nuclear Medicine, 2003, pp. 291-315, vol. 44(2).

* cited by examiner

METHOD FOR CREATING ATTENUATION CORRECTION MAPS FOR PET IMAGE RECONSTRUCTION

CROSS-REFERENCE TO RELATED APPLICATIONS

This application claims the benefit of Provisional U.S. Patent Application Ser. No. 61/620,073 entitled, "Patch-based Segmentation of UTE Brain Images to Create Attenuation Correction Maps for PET Reconstruction", filed in the name of Helene Chopinet, Francisco Pereira, James G. Reisman, and Christophe Chefd'hotel on Apr. 4, 2012 and Provisional U.S. Patent Application Ser. No. 61/644,029 entitled, "Accelerated. Multi-scale Patch-based Segmentation of MR Images to Identify the Bone Compartment and Create Attenuation Correction Maps for PET Image Reconstruction", filed in the name of Francisco Pereira, James G. Reisman, and Christophe Chefd'hotel on May 8, 2012, the disclosures of which are also hereby incorporated herein by reference.

FIELD OF INVENTION

The present invention generally relates to simultaneous MRI/PET image data acquisition. More particularly, the present invention relates to generating attenuation correction maps for PET image reconstruction.

BACKGROUND OF THE INVENTION

Positron emission tomography (PET), also known as PET imaging, is a type of nuclear medicine imaging that uses radioactive material, placed in a patient's body, to identify molecular activity and processes and, thus, assist in diagnosing disease, evaluating medical conditions, monitoring a patient's response to therapeutic interventions, etc. PET imaging may be accomplished through the use of stand-alone PET imaging systems or, as is more often the case today, hybrid MR-PET or CT-PET imaging systems which work to enhance the quality of the visualization of the acquired PET imaging data.

As shown in FIG. 1, a PET imaging system 10 generally comprises an imaging device (i.e., a scanner) 12 that can detect radioactive emissions from the radioactive material (also known as radiopharmaceuticals or radiotracers) in the internal body P area under examination, a data processor 14 that analyzes the detected emissions information, and an image processor 16 (which in some configurations may be part of the data processor 14) that converts the processed data into image data or images of the area under examination via mathematical image reconstruction software. A user interface 18 (which typically includes an associated display) accompanies the processors 14, 16 and controls the operation of the system 10 and the various components. Although not shown in detail, the various components are operably connected to one another via appropriate control circuitry which is manipulated via the user interface 18. The PET imaging system 10 may be realized as a stand-alone PET imaging system or as part of a larger hybrid MR-PET or CT-PET imaging system.

In operation, after an appropriate radiotracer is placed into a patient's body P and becomes concentrated in tissues of interest, the patient is placed in the central opening of the scanner 12. The radiotracer undergoes positron emission decay and each emitted positron travels in the tissue for a short distance until it interacts with an electron. The encounter annihilates both electron and positron, producing a pair of annihilation (gamma) photons γ moving in approximately opposite directions. The two photons γ travel to respective scintillation detectors that are diametrically opposed within a scintillation detector ring (not visible) forming a part of the central opening. Each photon γ first enters and travels through the respective scintillation detector that converts high-energy photons into electrical signals via a scintillation process. The data processor 14 analyzes the electrical signals and localizes the temporal photon pair along the straight line that joins the two opposed detectors (known as a line of coincidence or a line of response (LOR)). Each scan produces thousands of LORs which form a fan-beam over many angles. The data processor 14 forwards all LOR data to the image processor 16 where final image data is produced via mathematical image reconstruction algorithms and software. Briefly, a map of the sources of the temporal photon pairs may be constructed by solving sets of simultaneous equations for the total activities along the LORs. The resulting image map shows the tissues in which the radiotracer has become concentrated, and can be interpreted by an appropriate health professional.

The annihilation (gamma) photons γ travel through different layers of the patient's body P before reaching the scintillation detectors of the scanner 12. The interaction of the photons γ with the body layers results in an attenuation of the energy of each photon γ. The degree of energy attenuation varies depending upon the body P area under examination. The energy attenuation is sufficient to distort the analysis and resulting LOR data by the data processor 14 and the reconstruction of the body P images by the image processor 16. This can adversely affect the image interpretation and any medical diagnoses by the health professional. To correct for the attenuation, the patient normally undergoes CT imaging to accompany the PET imaging (e.g., as part of a hybrid CT-PET imaging system) so that data may be acquired that can generate attenuation correction data. The attenuation correction data may take on the form of data maps that are subsequently utilized by the PET system 10 to adjust the PET image reconstruction of the body P area under examination. This is described in more detail in an article by H. Zaidi and B. Hasegawa, entitled "Determination of the Attenuation Map in Emission Tomography", The Journal of Nuclear Medicine, Official Publication Society of Nuclear Medicine, 2003, pp. 291-315, Vol. 44(2).

It would be more advantageous to generate PET attenuation correction maps from MR imaging (e.g., as part of a hybrid MR-PET imaging system) so, among other reasons, the patient can avoid harmful ionizing radiation used by CT imaging. However, MR imaging does not normally produce images with clearly defined bone segmentation, which is essential to performing accurate attenuation correction of PET imaging data.

Bone segmentation has many applications in medical imaging, from clinical research to diagnostics to surgery. Since manual segmentation by an expert is time-consuming and presents issues of intra and inter-reliability, different methods of automatic labeling have been developed during the last decade. On MR images, intensity is similar in bones and air (i.e., air-filled body cavities), therefore a segmentation relying solely on the image is not feasible. To overcome this issue, atlas-based methods have been used, combining intensity and spatial information (this is described in an article by D. V. Iosifescu, M. E. Shenton, S. K. Warfield, R. Kikinis, J. Dengler. F. A. Jolesz, and R. W. McCarley, entitled "An Automated Registration Algorithm for Measuring MRI Subcortical Brain Structures", NeuroImage, 1997, pp. 13-25, Vol. 6(1)). Atlases are reference/template patients or subjects (also called "textbook subjects") for whom MR and CT scans are available and which have undergone bone segmentation based on the CT scans. An atlas' MR images and segmentation labels are then registered to the patient under examination (also called herein the "test subject") whose segmentation is to be produced.

Atlas-based methods, where one or several template structural MR scans are paired with their corresponding segmentations to form the atlases, have been used for a few years (see, for example, the above-cited Iosifescu et al. article). It also has been shown that using multiple atlases improves accuracy (see, for example, articles by C. Svarer, K. Madsen, S. G. Hasselbalch, L. H. Pinborg, S. Haugbøl, V. G. Frøkjaer, S. Holm, O. B. Paulson, and G. M. Knudsen, entitled "MR-based Automatic Delineation of Volumes of Interest in Human Brain PET Images using Probability Maps", Neuroimage, 2005, pp. 969-979, Vol. 24(4); T. Rohlfing, D. B. Russakoff, and C. R. Maurer, entitled "Expectation Maximization Strategies for Multi-atlas Multi-label Segmentation", Information Processing in Medical Imaging Proceedings of the Conference, 2003, pp. 210-221, Vol. 18; and T. Rohlfing, R. Brandt, R. Menzel, D. B. Russakoff, and C. R. Maurer, Jr., entitled "Quo Vadis, Aatlas-based Segmentation?", Strategies, 2005, pp. 435-486, Vol. 3(2)). In all of these atlas-based methods, the assumption is that registration of the test subject MR scan to a template MR scan works well enough that a voxel in the former can be assigned the segmentation label of the corresponding voxel in the latter.

However, this assumption may not hold. For example, in the case of the head/brain examination, the perfect bijection from one head to another doesn't exist due to a large neuroanatomical variability. In such cases, single voxels may be replaced by 3D regions or patches of voxels (usually in the form of a cube) which convey more information. These patch-based atlas methods thus map a patch around a voxel in the test subject MR scan to patches in roughly the same location in one or more template MR scans (this is described in articles by F. Rousseau, P. A. Habas, and C. Studholme, entitled "A Supervised Patch-based Approach for Human Brain Labeling", IEEE Transactions on Medical Imaging, 2011, pp. 1852-1862, Vol. 30(10) and P. Coupé, J. V. Manjón, V. Fonov, J. Pruessner, M. Robles, and D. L. Collins, entitled "Patch-based Segmentation using Expert Priors: Application to Hippocampus and Ventricle Segmentation", NeuroImage, 2011, pp. 940-954, Vol. 54(2), each article being incorporated herein by reference). These methods rely on a measure of similarity between patches, such as correlation or square difference of intensity (see, for example, the Rousseau et al article above and an article by M. Sdika, entitled "Combining Atlas Based Segmentation and Intensity Classification with Nearest Neighbor Transform and Accuracy Weighted Vote", Medical Image Analysis, 2010, pp. 219-226, Vol. 14(2)). Furthermore, as there might be multiple templates/atlases, similar patches across them must be combined, typically by a voting (see, for example, an article by X. Artaechevarria, A. Muñoz-Barrutia, and C. Ortiz-de-Solórzano, entitled "Combination Strategies in Multi-atlas Image Segmentation: Application to Brain MR Data", IEEE Transactions on Medical Imaging, 2009, pp. 1266-1277, Vol. 28(8)) or non-local label fusion scheme (see, for example, the above articles by Rousseau et al. and Coupé et al.). The main advantage of the latter scheme is that input and atlas images don't have to match perfectly. Consequently, a rigid registration which reduces the time cost is sufficient (as noted in the above-cited Coupé et al. article).

A patch-based segmentation approach may be useful in allowing MR imaging to produce images with more clearly defined bone segmentation and, thus, in performing more accurate attenuation correction of PET imaging data.

SUMMARY OF THE INVENTION

The above problems are obviated by the present invention which provides an embodiment of a method for correcting attenuation of positron emission tomography (PET) image data of an area under examination, comprising segmenting magnetic resonance (MR) images of the area under examination into bone, soft tissue, and air utilizing a patch-based segmentation technique; creating pseudo-computed tomography (CT) images from the segmented MR images; and generating attenuation correction maps for the PET image data from the pseudo-CT images. The method may further comprise characterizing the attenuation correction maps generated from the pseudo-CT images relative to attenuation correction maps generated from CT images of a reference area under examination. The MR images may comprise MR ultra-fast TE sequence images. Alternatively, the MR images may comprise at least two different types of MR ultra-fast TE sequence images.

The patch-based segmentation technique may comprise predicting the label of a voxel in a respective MR image by comparing the voxel with a voxel in a corresponding location in a reference area under examination. Alternatively, the patch-based segmentation technique may comprise predicting the label of a voxel in a respective MR image by comparing a surrounding 3D patch of voxels with 3D patches of voxels in a corresponding location or neighboring locations in a reference area under examination and combining the labels of those deemed similar. In such case, the segmenting step may comprise affine-registering the reference area under examination to a respective MR image area under examination prior to the predicting step. Also, the neighboring locations may be in close vicinity of the corresponding location in the reference area under examination.

Also, the patch-based segmentation technique may comprise classifying each voxel in a respective MR image based on the weighted similarities of 3D patches of voxels in a corresponding location or neighboring locations in a reference area under examination with a 3D patch of voxels surrounding the voxel. In such case, the segmenting step may comprise affine-registering the reference area under examination to a respective MR image area under examination prior to the predicting step. Also, the neighboring locations may be in close vicinity of the corresponding location in the reference area under examination.

The pseudo-CT image may comprise a respective MR image of the area under examination having each voxel being assigned a respective density value for each of bone, soft tissue and air based on the segmenting step results. The pseudo-CT image may also comprise a respective MR image of the area under examination having each voxel being assigned a respective density value for each of bone, soft tissue and air based on the segmenting step results, each respective density value being variable across a given segment type. The pseudo-CT image may also comprise a respective MR image of the area under examination having each voxel being assigned a respective density value for each of bone, soft tissue and air based on corresponding patch locations in CT images of a reference area under examination. The characterizing step may comprise generating a bias map that compares the attenuation correction maps generated from the pseudo-CT images with the attenuation correction maps generated from the CT images of the reference area under examination. In such case, the bias map may comprise an encoded visualization of the image of the area under examination. Alternatively, the characterizing step may comprise calculating a distribution of bias values across voxels in a 3D mask image of the reference area under examination produced by the CT images.

The present invention may also provide an embodiment of a method of combined magnetic resonance (MR) and positron emission tomography (PET) imaging, comprising acquiring MR and PET images of an anatomical region, obtaining labels for each voxel of a respective MR image based on a comparison of a 3D patch of voxels surrounding the voxel with 3D patches of voxels in a corresponding location or neighboring locations in a reference anatomical region; creating pseudo-CT images from the labeled MR images; and performing attenuation correction of the PET image data from the pseudo-CT images. The MR image data may comprise MR ultra-fast TE sequence images. The obtaining step may result in a bone segmentation of the anatomical region.

The present invention may also provide an embodiment of a PET imaging apparatus, comprising a scanner that is adapted to detect radioactive emissions from radioactive material injected into a target body region; a data processor that analyzes the detected emissions information; an image processor that converts the processed information into image data of the target body region via mathematical image reconstruction software; means for obtaining an MR image of the target body region, obtaining labels for each voxel of the MR image based on a voxel patch-based segmentation; creating pseudo-CT images from the labeled MR image; and performing attenuation correction of the PET image data from the pseudo-CT image.

DESCRIPTION OF THE DRAWINGS

For a better understanding of the present invention, reference is made to the following description of an exemplary embodiment thereof, and to the accompanying drawings, wherein.

DETAILED DESCRIPTION

Figure 1:
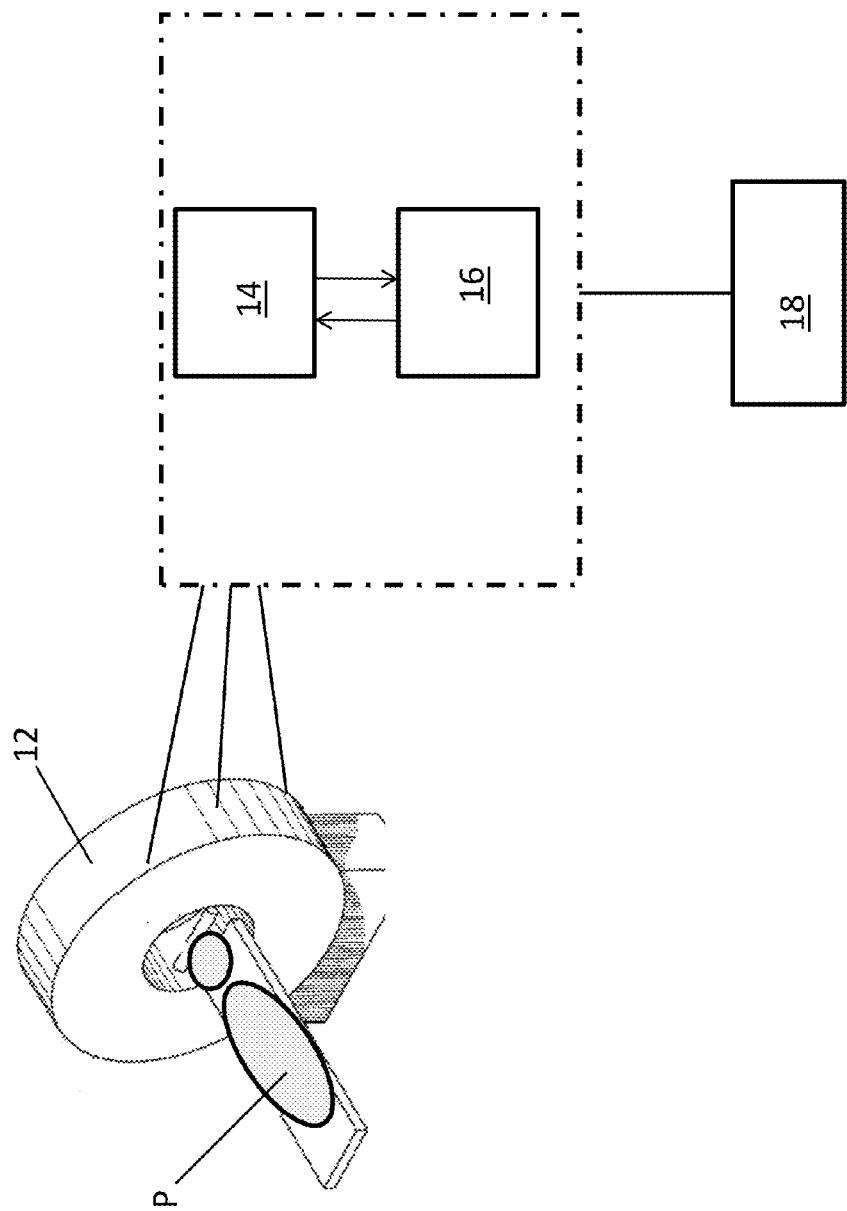
FIG. 1 is an illustration of a PET imaging system (simplified)
Figure 2:
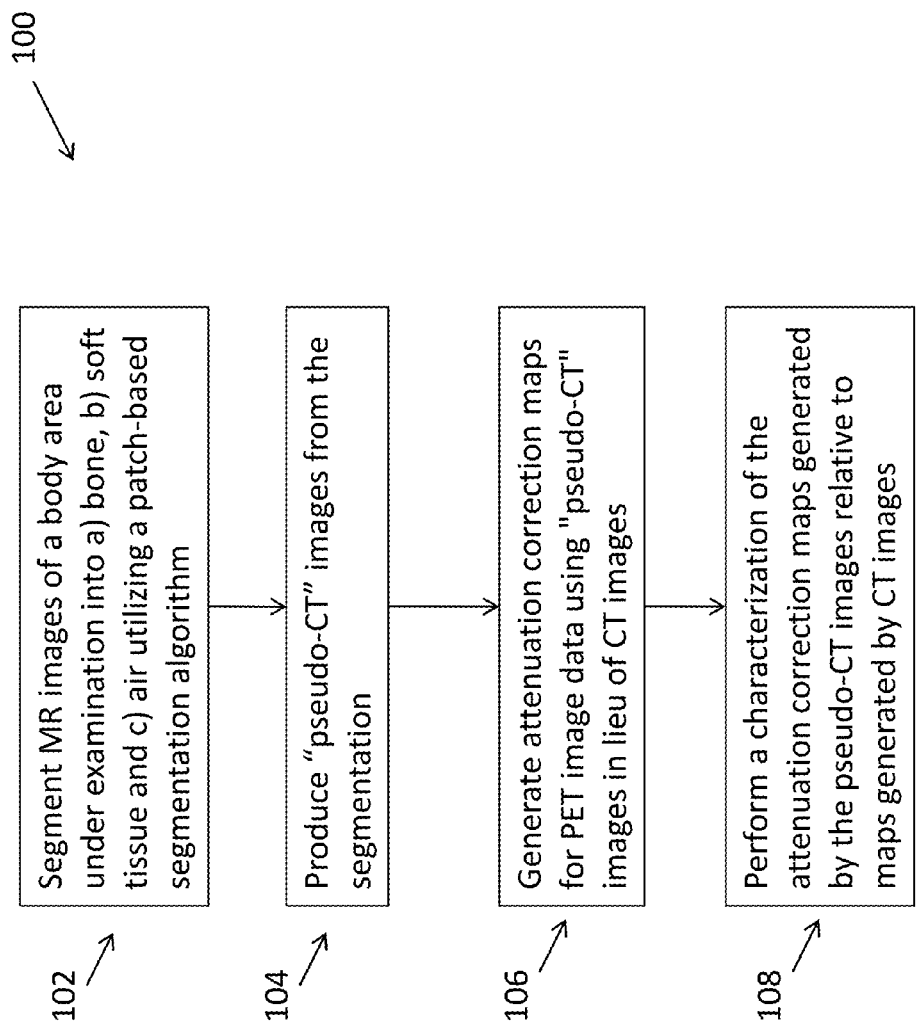
FIG. 2 is a flow chart of the steps of an embodiment of a method carried out in accordance with the present invention.

FIG. 2 shows an embodiment of a method 100 of the present invention to perform attenuation correction, using MR imaging, of PET imaging data. The PET imaging system 10 and, in particular, either processor 14, 16, is adapted to operate according to the method 100. The method 100 is described herein with reference to a patient's head/brain as the body P area under examination although it is understood that the method 100 is not so limited and may be applied to any body P area of interest.

Generally, the method 100 comprises utilizing a patch-based segmentation technique or algorithm to segment MR images of a body area under examination into bone, soft tissue, and air (Step 102). The method 100 then produces "pseudo-CT" images from the segmentation (Step 104). As further described below, the method 100 generates a pseudo-CT image by replacing the predictions of bone, soft tissue and air (from the patch mappings) with typical, fixed Hounsfield unit values for each of those in existing CT images. These "pseudo-CT" images can be used in lieu of CT images to generate attenuation correction maps for PET image reconstruction of the body P area under examination (Step 106). The method 100 may also perform a characterization of the attenuation correction maps generated by the pseudo-CT images relative to the attenuation correction maps generated by CT images (Step 108).

The patch-based segmentation (or classification) algorithm may be an existing technique, for example, an implementation of the group wise label propagation algorithm described in the above-cited Rousseau et al. article. The implemented algorithm relies on two assumptions about the label of a voxel. The first is that the label is a function of the intensity in the 3D patch surrounding it. The second is that the label is likely to be the same as the labels of voxels in roughly the same location in other subjects, if their respective surrounding patches are similar to this voxel. These assumptions suggest that the label of a voxel in the patient under examination (i.e., the test subject) can be predicted by comparing its surrounding patch with patches in the same or neighboring locations in other, annotated atlas subjects, and combining the labels of those patches deemed similar. The Rousseau et al. article lists several specific combination methods although any combination method may be used, for example, a method using a majority voting strategy where one identifies corresponding patches and picks the label having the majority number.

A more complex combination procedure, as well as a way whereby correspondence is determined, is described. More formally, let $R_{(x,y,z)}(r)$ be the 3D range of radius r centered on the voxel with coordinates (x, y, z) (all the voxels from (x−r, y−r, z−r) to (x+r, y+r, z+r)}. Also, let $P_{(x,y,z)}$(subject, r) stand for the values of the voxels in the $R_{(x,y,z)}(r)$ range in a test subject image, and $L_{(x,y,z)}$(subject) for the label of that voxel: bone (2); soft tissue (1); or air (0). The parameters for the algorithm are the patch radius p and the search neighborhood radius r. For a given test subject, the algorithm starts by initializing tallies for the three possible labels at each voxel (x, y, z), (x, y, z), $T_{(x,y,z)}^{bone} = T_{(x,y,z)}^{soft} = T_{(x,y,z)}^{air} = 0$. It then performs the following steps, using each atlas subject in turn:

a) estimate the image noise σ using the method, for example, described in the above-cited Coupé et al. article;
b) for each voxel (x, y, z) in the test subject,
   i) for each voxel with coordinates (u, v, w) in range $R_{(x,y,z)}(r)$ of the atlas subject,
      1) compute similarity using, for example, the following relationship $\|P_{(x,y,z)}(\text{test},p) - P_{(u,v,w)}(\text{atlas},p)\|_2^2$ and 2) derive weight using, for example, the following relationship $$w((x, y, z), (u, v, w)) = \exp\left(-\frac{sim.}{2N\sigma}\right),$$

ii) normalize all w((x, y, z),(u, v, w)) so that $$\sum_{(u,v,w)} w((x, y, z), (u, v, w)) = 1,$$

and iii) for each voxel (u, v, w), add w((x, y, z), (u, v, w)) to the tally for its label, $$T(x,y,z)^{L(u,v,w)(atlas)}$$

After these steps are carried out using all atlas subjects, the resulting tallies are used to classify each voxel (x, y, z) in the test subject, by choosing the label whose tally is highest (and breaking tally ties arbitrarily). Note that only one atlas subject may also be used although, as noted above, multiple atlases provide better accuracy. Also note that, within a certain radius, the more similar an atlas subject patch is to that in the test subject the more weight it gets in a vote.

In summary, the patch-based segmentation algorithm is based on the idea that a patch of the MR image of the test subject can be labeled by considering patches in the MR images of atlas/textbook subjects that 1) look similar to it and 2) are roughly in the same region. The algorithm requires specification of:

a. the patch size;
b. the search area (the cubic volume around the location to be labeled where similar patches are to be sought in the textbook subjects);
c. the similarity measure between a patch in the test subject and in the textbook subjects (i.e. the Euclidean distance); and
d. the label combination procedure for assembling a single label prediction from multiple textbook subjects.

Figure 3:
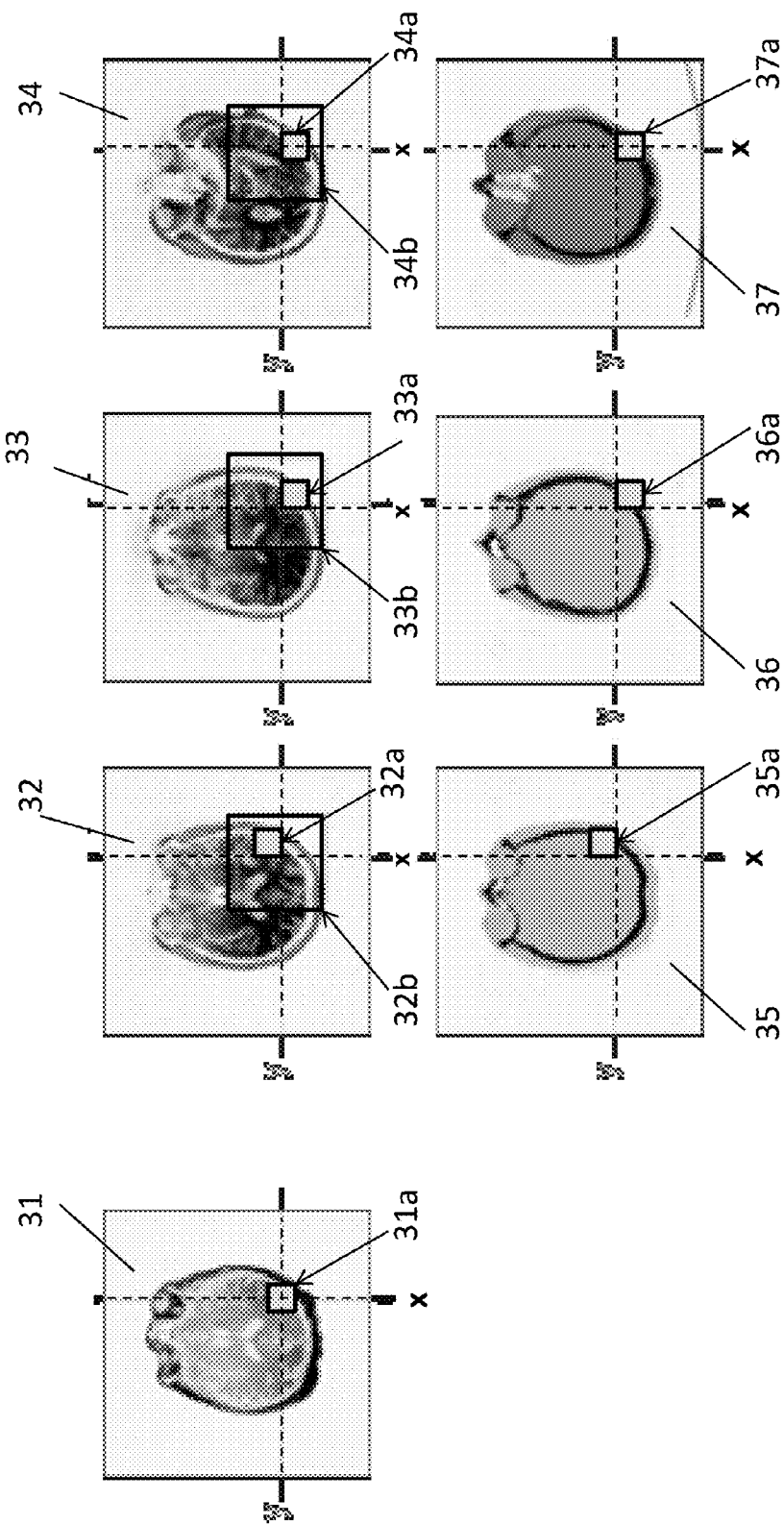
FIG. 3 shows an MR scan for a test subject and the corresponding MR and CT scans of three atlas/textbook subjects.

FIG. 3 shows an MR image 31 of a test subject with a patch 31a to be labeled located by the x- and y-axis cross-hairs (shown as dotted lines). Also shown are corresponding MR images 32, 33, 34 of three textbook subjects, each with a patch 32a, 33a, 34a most similar to the test subject MR patch 31a to be labeled, located around the test subject x- and y-axis cross-hairs (shown as dotted lines). Each most similar patch 32a, 33a, 34a is surrounded by a search area 32b, 33b, 34b surrounding its location. The figure also shows corresponding CT images 35, 36, 37 of the three textbook subjects, each with a patch 35a, 36a, 37a corresponding to the test subject MR patch 31a to be labeled, also located around the test subject x- and y-axis cross-hairs (shown as dotted lines).

The method 100 is further described with respect to experiments that were conducted to evaluate the method 100 and its respective steps. Several sets of data were collected for the experiments. For each of six (6) test subjects S1-S6, both CT and MR images were acquired of the head and brain. The MR images were registered non-rigidly to the CT images. For both modalities, each image is a 3D grid of 192×192×192 voxels. The CT imaging was used to produce a mask image covering the head and surrounding space for both modalities (dilated 10 times). The CT imaging was then manually thresholded at different levels of Hounsfield units to obtain a segmentation into air/background, soft tissue, and bone (henceforth referred to as a label image). For three of the test subjects S4-S6, similarly registered PET data was also obtained, which was used to evaluate attenuation correction maps generated from the MR imaging.

To examine the segmentation step (Step 102) of the method 100, an experiment was conducted to see how well bone and soft tissue labels obtained from CT imaging could be predicted (i.e., in this case, how well bone and soft tissue labels obtained or predicted from MR imaging match those obtained from CT imaging, which is the label image). The segmentation step was found to identify bone appreciably well in MR UTE (ultra-fast TE sequence) images as compared to a baseline method.

In the experiment, each of the six (6) subjects S1-S6 was used as the test subject in turn, with the remaining five (5) subjects used as atlas subjects. The atlas subjects were affine-registered to the test subject. Affine registration was chosen for the experiment because it is fast, a consideration in practical applications of the method 100. The experiment generated label predictions for each test subject using patch radii 1, 2 and 4, and neighborhood radii 1, 2, 4, 6 and 8. The Dice Index (a well-known similarity measure over sets of data that can be used to judge how good is a prediction) was then computed for the three possible predictions (one for each patch radius). This is 2TP/(2TP+FN+FP), where TP, FN and FP are the numbers of true positives, false negatives and false positives, respectively, in the prediction of each of the three label values.

Figure 4:
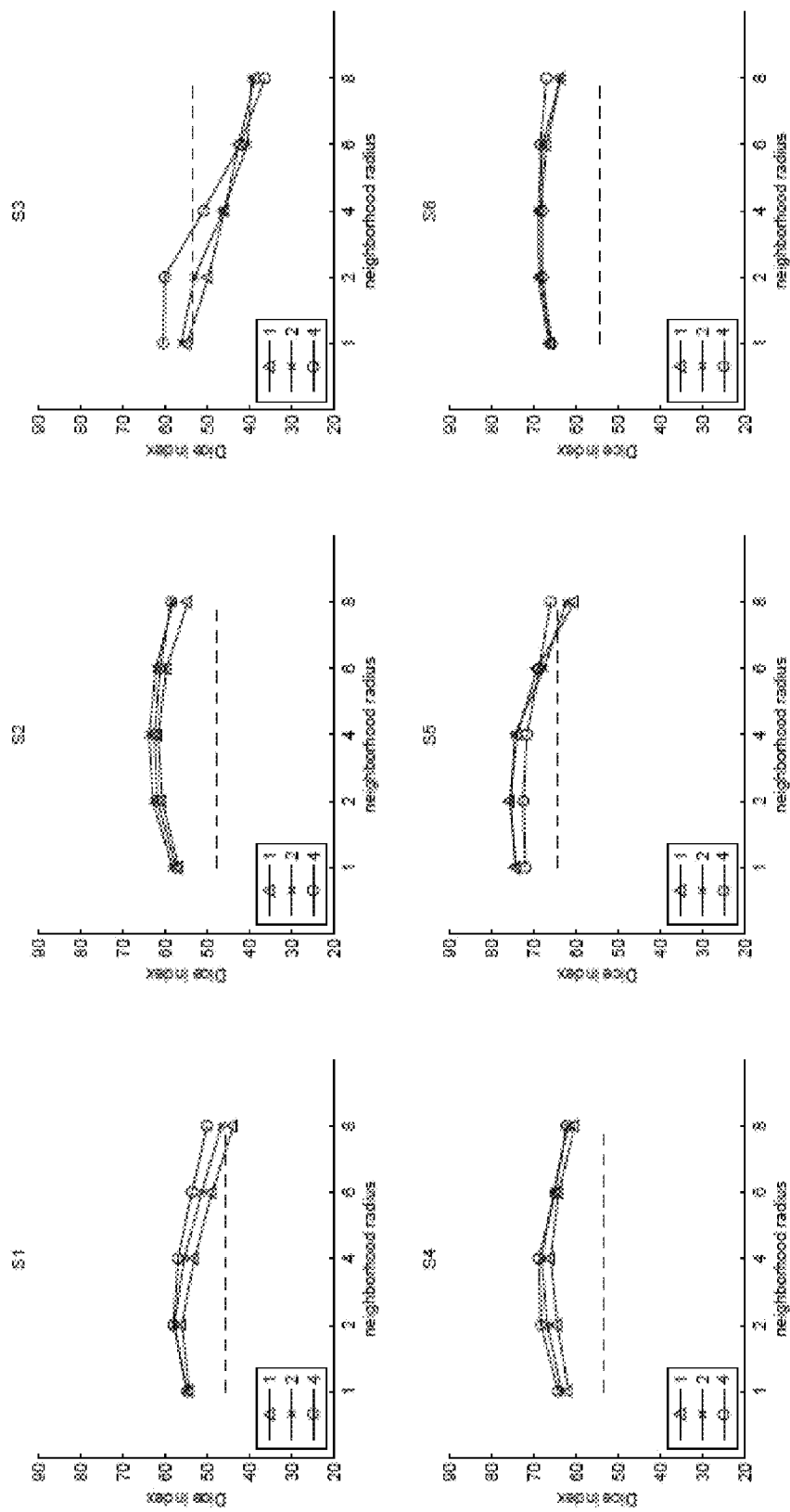
FIG. 4 shows plots of bone segmentation predictions/results for six test subjects using a method step of FIG. 2.

FIG. 4 shows the experimental results for bone prediction. Specifically, FIG. 4 shows a plot for each of the six subjects S1-S6 and the respective Dice Index of the bone prediction using patch radii 1, 2, 4 and neighborhood radii 1, 2, 4, 6, 8. Each plot also contains a dashed baseline for a prediction made using a single voxel instead of a 3D patch. Across the six subjects S1-S6, the Dice index is maximum at neighborhood radius 2 or 4. The results are fairly close for various patch sizes at these neighborhood radii, with radius 4 appearing slightly better all-around than radius 2. As the neighborhood radius keeps increasing, the results worsen and more so for smaller patch sizes. As far as can be ascertained from actual label images, this seems to be due to an increase in the number of patches identified as similar to the test subject patch, as the search neighborhood widens. This is not surprising given that a very simple similarity measure—squared distance—was used. In order to establish the extent to which the results were driven simply by alignment of atlas subjects to the target subject, a baseline score was included that was obtained by running the segmentation algorithm assuming the patch was a single voxel, without any neighborhood search.

Figure 5:
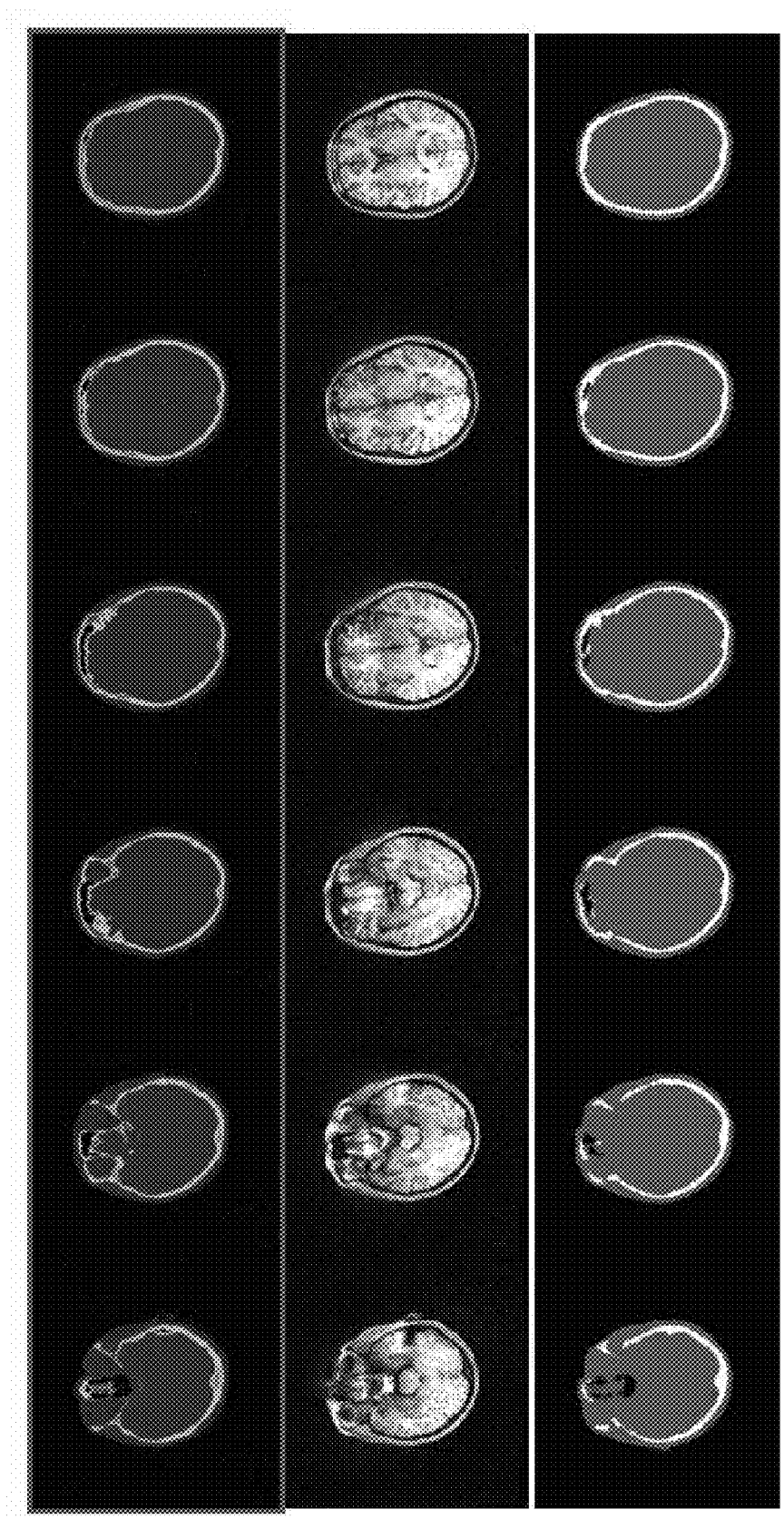
FIG. 5 shows the CT imaging, the MR imaging, and the bone segmentation predictions/results for one of the test subjects of FIG. 4.

The experiment sought to find patch and neighborhood radii that worked well for bone segmentation predictions across all subjects S1-S6, rather than validate the method. As noted previously, the results do indicate that the segmentation step works for the purpose of identifying bone in realistic brain MR images. Note that, in the above-cited Rousseau article, this particular task was done only for simulated images. To give a qualitative sense of the label predictions for test subject S5, FIG. 5 shows the original CT image (top image series), the MR image used as source data (middle image series) and the prediction of bone and soft tissue from the MR image generated for patch radius 2 and neighborhood radius 4 (bottom image series).

To examine the remaining steps (Steps 104, 106, 108) of the method 100, an experiment was conducted to ascertain to what extent the label images predicted from MR data could be used to create pseudo-CT images usable in place of CT images for attenuation correction of PET images. One result was support for a procedure used to produce pseudo-CT images from the segmentation step (Step 104) and for a procedure used to generate attenuation correction maps (Step 106).

The experiment examined the three (3) test subjects S3-S5 for which registered PET data was obtained (as noted above).

Figure 6:
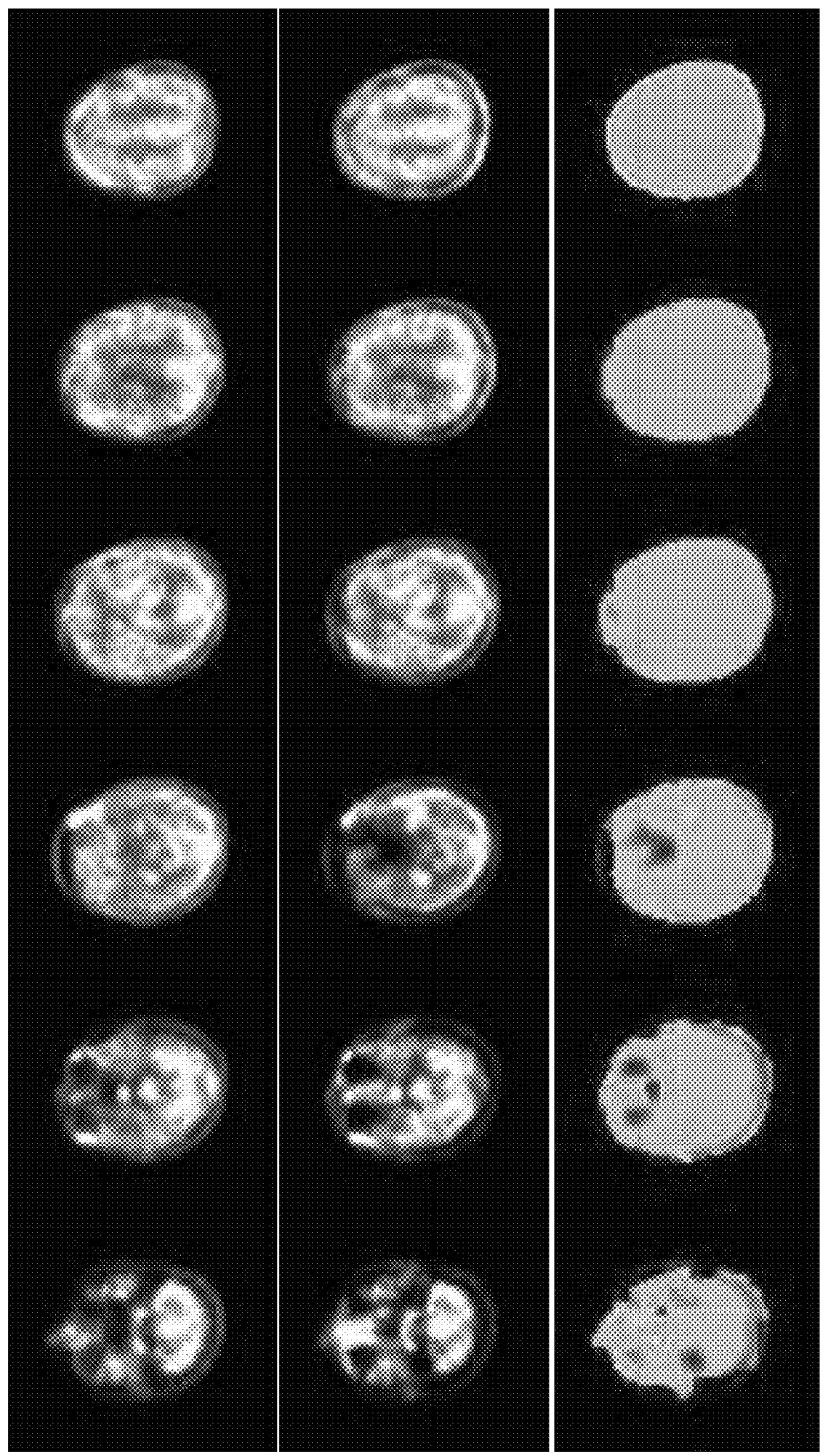
FIG. 6 shows PET attenuation correction maps for a test subject.

Given a particular prediction of air/soft tissue/bone segmentation for each test subject MR image, a respective pseudo-CT image was generated by assigning fixed Hounsfield unit (HU) values to each voxel of the MR image (for example, −1000 for air, 39 for soft tissue, and 1000 for bone). Both CT and pseudo-CT images were then processed to produce PET attenuation correction maps, which are illustrated in FIG. 5 for test subject S5. FIG. 6 specifically shows, for test subject 5, attenuation correction maps produced from CT imaging (top row), attenuation correction maps produced from pseudo-CT imaging derived from predictions (middle row), and a bias map (bottom row). The bias map is an encoded visualization of the acquired image, such as, a grayscale or color mapping, or coding with a color scale that, for example, ranges from dark blue (−100%) to bright red (+100%) of the CT image value in a voxel.

Figure 7:
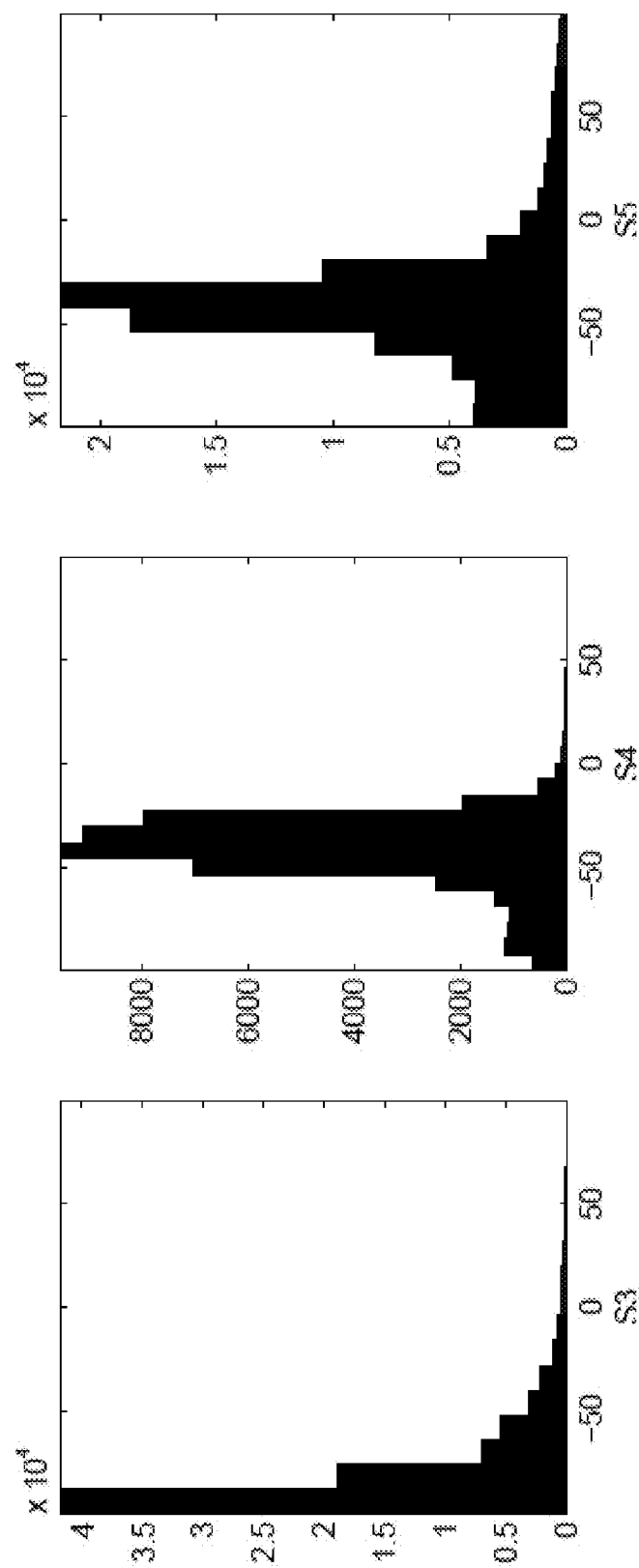
FIG. 7 shows plots of distribution of bias values of PET attenuation correction, generated by the method of FIG. 2, for three test subjects.

Another result of the experiment was a characterization of the attenuation correction maps created from pseudo-CT imaging relative to the ones created from CT imaging (Step 108). The two sets can be directly compared through the bias map, with the bias value at each voxel v being equal to [(pseudo CT(v)−CT(v))/CT(v)]×100. FIG. 7 shows histograms of these bias values (i.e., a distribution of bias values) for the three test subjects S3-S5 across voxels in a 3D mask covering the skull in CT images. For each histogram, the x axis is the bias value being computed with the above formula and the y axis is the number of voxels having that bias value.

The method 100 and, in particular, the patch-based segmentation technique may be optimized or modified in several ways, especially for situations where the existing methods do not yield good results. In describing these modifications, the term "test period" refers to the prediction of labels for a test subject when the data becomes available, and the term "training period" refers to any processing done on atlas/textbook subjects prior to their being used in the test period.

For example, the segmentation technique may be modified to allow scaling of the approach to much larger, more varied textbook subject populations. Specifically, the modification may provide that a large number of textbook subjects are registered non-rigidly to a single template (or more, depending on population size and subgroups) in the training period, and the test subject is registered rigidly to the template(s) in the test period. The use of a group template(s) as a registration target(s) would accelerate the segmentation by moving computation to the training period, and permitting it to scale to larger sets of textbook subjects. This modification may be accomplished by first creating a group template for the textbook subjects, and registering all of them to the group template. As noted, there can be more than one template if there are distinct population subgroups. The registration can be as time-consuming as needed for accuracy, as it takes place during the training period. Then, during the test period, the test subject is registered rigidly to the template(s). This is both faster than registering all textbook subjects to the test subject, which prevents scaling of the method, and allows other optimizations that rely on combining textbook subject information during the training period (as described below).

A segmentation technique also may be modified to allow acceleration of the running time. In particular, a segmentation technique may be modified to accelerate the search for patches in textbook subjects by pre-computing a search path that covers relevant space in all of them, during the training period. This allows the search area to be reduced even as the range covered is increased and no longer be restricted to have a cubic shape. The results of the search may then be exploited during the test period. This modification may be accomplished by first computing a summation image from all textbook subject bone label images, yielding an image containing all the positions where bone labels may be encountered in any textbook subject. This will speed up the segmentation algorithm by avoiding computing patch similarity for locations where no textbook subject has a bone label. Then, for each slice in the summation image, identify a circumscribed polygon containing all bone labels, and an inscribed polygon inside it containing as much empty space as possible (approximate solutions to each problem are acceptable). This will speed up the segmentation algorithm by restricting the search range within each slice (e.g. in axial slices around the chest, most of the space in the middle is empty). Finally, regularize predictions for a test subject location by taking into account a) the predictions for neighboring locations (i.e. spatial smoothness enforced at prediction), and b) the number of neighbors of the same label for a location in an atlas subject where a patch is similar.

Further, a segmentation technique may be modified to improve result quality wherein multiple patch sizes are taken into account, either by running the segmentation algorithm multiple times and combining results or by considering multiple patch sizes when computing patch similarity at a given location. By using patch information at multiple scales, one can exploit the fact that bone structures have many different shapes and dimensions, and hence different patch sizes will be adequate for each structure. As a first step, for a given neighborhood search approach (either the default one described with respect to an unmodified method 100 or one specified in the above modification descriptions), the segmentation algorithm is run multiple times with different patch sizes (e.g. 3×3×3, 4×4×4, etc) and the results are combined. Each run results in a prediction image and thus a set of predictions for each voxel. These predictions in respective set of predictions can be combined using one of several voting functions, e.g. label most prevalent wins, give priority to any prediction of bone, then soft tissue, then air, etc. Given that the segmentation algorithm is conservative in determining similarity, this should not give rise to false positives. The final image can then be smoothed spatially to take advantage of the fact that predictions are expected to be relatively consistent spatially. Next, the function that computes patch similarity to take multiple scales into account is modified. Specifically, each patch is represented in a multiscale basis, robust to rotation if possible (e.g. using wavelets or SIFT/SURF features, but not limited to those), and the similarity of the coefficient vectors for the two patches being compared is computed. Alternatively, a weighted vote of similarities at multiple patch sizes when each location is being considered may be computed. Note that SIFT (Scale Invariant Feature Transform) and SURF (Speeded Up Robust Features) are well known detectors and descriptors used in image similarity techniques.

The method 100 may be modified more generally. For example, the method 100 may provide an adaptive method for producing Hounsfield unit values. Specifically, the method 100 may provide a method for producing Hounsfield unit values for tissue in pseudo-CT images by learning a patch-based regression model based on the average intensity or any other patch-derived features, instead of picking constant values for each tissue type. This requires one regression model per tissue type. Thus, using adaptive generation of Hounsfield unit values in pseudo-CT images obtains Hounsfield unit values that can vary across a given type of tissue, rather than be set to a constant or fixed value for that type, across all subjects. The novel method may comprise, for each labeled atlas subject, learning a patch-based predictor of Hounsfield unit values (e.g., a regression model such as, but not limited to, a linear regression) from the textbook subject MR images, using as targets the Hounsfield unit values from the corresponding CT imaging. The result would be one model for bone, one model for soft-tissue, one model for air, etc. Then, for each location in a test subject MR image, all the textbook subject predictors for the predicted tissue type at that location are applied and the average prediction is used as the Hounsfield unit value.

Also, the method 100 may provide a patch-based algorithm/technique for direct prediction of Hounsfield unit values. A patch-based Hounsfield unit prediction algorithm/technique would use patch similarity over textbook subjects to directly generate a Hounsfield unit value, rather than using a categorical tissue type prediction. To directly predict Hounsfield unit values from a patch, the novel technique uses the patch-based segmentation algorithm of the method 100. However, instead of combining the tissue type predictions over multiple patches in textbook subjects, the Hounsfield unit values are combined for the patch locations in their respective CT images. In particular, the above-described segmentation algorithm of the method 100 predicts the tissue type for one location by adding weighted votes to a tally, containing one possibility for each tissue type. To perform direct prediction of Hounsfield unit values, the method 100 can keep a parallel tally and add the weighted Hounsfield unit value for each patch considered. This results in an average Hounsfield unit value for each type of tissue and the one corresponding to the type predicted for that location can then be used. This approach would also allow the above-described modifications of the segmentation technique to be exploited.

Other modifications are possible within the scope of the invention. For example, the subject to be scanned may be an animal subject or any other suitable object rather than a human patient. The method 100 may be modified by including two different types of MR UTE sequence images and combining them (or use a patch-similarity function that takes both into account). Also, the method 100 may utilize MR UTE images, Dixon MR images, as well as MR images obtained using other MR imaging methods. The method 100 may also be modified by searching over different size neighborhoods, or using a search strategy defined by the location of labels in atlas subjects, other than as described above.

Also, although the steps of the method 100 have been described in a specific sequence, the order of the steps may be re-ordered in part or in whole and the steps may be modified, supplemented, or omitted as appropriate. Also, the method 100 may use various well known algorithms and software applications to implement the steps and substeps. Further, the method 100 may be implemented in a variety of algorithms and software applications. Further, the method 100 may be supplemented by additional steps or techniques. It is also understood that the method 100 may carry out all or any of the steps using real-time data, stored data from a data archive or database, data from a remote computer network, or a mix of data sources.

Also, the various described instrumentation and tools may be configured and interconnected in various ways as necessary or as desired. Further, although in the described method 100 the user may use self-contained instrumentation and tools, the user may use other instrumentation or tools in combination with or in place of the instrumentation and tools described for any step or all the steps of the method 100, including those that may be made available via telecommunication means. Further, the described method 100, or any steps, may be carried out automatically by appropriate instrumentation and tools or with some manual intervention.

What is claimed is:

1. A method for correcting attenuation of positron emission tomography (PET) image data of an area under examination, comprising:
   (a) segmenting magnetic resonance (MR) images of the area under examination utilizing a patch-based segmentation technique, wherein the area under examination is a part of a subject's body;
   (b) creating pseudo-computed tomography (CT) images from the segmented MR images;
   (c) generating attenuation correction maps for the PET image data from the pseudo-CT images, and
   (d) characterizing the attenuation correction maps generated from the pseudo-CT images relative to attenuation correction maps generated from CT images by comparing the attenuation correction maps generated from the pseudo-CT images to attenuation correction maps generated from CT images of a reference area under examination.

2. The method of claim 1, wherein the MR images comprise MR ultra-fast TE sequence images.

3. The method of claim 1, wherein the MR images comprise at least two different types of MR ultra-fast TE sequence images.

4. A method for correcting attenuation of positron emission tomography (PET) image data of an area under examination, comprising,
   (a) segmenting magnetic resonance (MR) images of the area under examination utilizing a patch-based segmentation technique, wherein the area under examination is a part of a subject's body, wherein the patch-based segmentation technique comprises predicting the label of a voxel in a respective MR image by comparing the voxel with a voxel in a corresponding location in a reference area under examination in an MR image in an MR image atlas, and the reference area under examination comprises a group reference that combines more than one reference area under examination, wherein each reference area is from a different MR image in the MR image atlas;
   (b) creating pseudo-computed tomography (CT) images from the segmented MR images; and
   (c) generating attenuation correction maps for the PET image data from the pseudo-CT images.

5. A method for correcting attenuation of positron emission tomography (PET) image data of an area under examination, comprising,
   (a) segmenting magnetic resonance (MR) images of the area under examination utilizing a patch-based segmentation technique, wherein the area under examination is a part of a subject's body, wherein the patch-based segmentation technique comprises predicting the label of a voxel in a respective MR image by comparing a surrounding 3D patch of voxels with 3D patches of voxels in a corresponding location or neighboring locations in a reference area under examination in an MR image in an MR image atlas and combining the labels of those deemed similar, and the reference area under examination comprises a group reference that combines more than one reference area under examination, wherein each reference area is from a different MR image in the MR image atlas
   (b) creating pseudo-computed tomography (CT) images from the segmented MR images; and
   (c) generating attenuation correction maps for the PET image data from the pseudo-CT images.

6. The method of claim 5, wherein the reference area under examination comprises 3D patches of voxels having only bone-labeled voxels.

7. The method of claim 5, wherein the patch-based segmentation technique comprises repeating the predicting step for a plurality of sizes of 3D patches of voxels in the reference area under examination and combining the predicting results for each voxel.

8. The method of claim 5, wherein the segmenting step comprises affine-registering the reference area under examination to a respective MR image area under examination prior to the predicting step.

9. The method of claim 8, wherein the reference area under examination comprises a group reference that combines more than one reference area under examination, wherein each reference area is from a different MR image in the MR image atlas.

10. The method of claim 8, wherein the reference area under examination comprises 3D patches of voxels having only bone-labeled voxels.

11. The method of claim 8, wherein the patch-based segmentation technique comprises repeating the predicting step for a plurality of sizes of 3D patches of voxels in the reference area under examination and combining the predicting results for each voxel.

12. The method of claim 5, wherein the neighboring locations are in close vicinity of the corresponding location in the reference area under examination.

13. A method for correcting attenuation of positron emission tomography (PET) image data of an area under examination, comprising:
(a) segmenting magnetic resonance (MR) images of the area under examination utilizing a patch-based segmentation technique, wherein the area under examination is a part of a subject's body, wherein the patch-based segmentation technique comprises classifying each voxel in a respective MR image based on the weighted similarities of 3D patches of voxels in a corresponding location or neighboring locations in a reference area under examination in an MR image in an MR image atlas with a 3D patch of voxels surrounding the respective voxel, wherein the segmenting step comprises affine-registering the reference area under examination to a respective MR image area under examination prior to the predicting step, and the reference area under examination comprises a group reference that combines more than one reference area under examination, wherein each reference area is from a different MR image in the MR image atlas
(b) creating pseudo-computed tomography (CT) images from the segmented MR images; and
(c) generating attenuation correction maps for the PET image data from the pseudo-CT images.

14. The method of claim 13, wherein the reference area under examination comprises a group reference that combines more than one reference area under examination, wherein each reference area is from a different MR image in the MR image atlas.

15. The method of claim 13, wherein the reference area under examination comprises 3D patches of voxels having only bone-labeled voxels.

16. The method of claim 13, wherein the patch-based segmentation technique comprises repeating the predicting step for a plurality of sizes of 3D patches of voxels in the reference area under examination and combining the predicting results for each voxel.

17. The method of claim 13, wherein the reference area under examination comprises 3D patches of voxels having only bone-labeled voxels.

18. The method of claim 13, wherein the patch-based segmentation technique comprises repeating the predicting step for a plurality of sizes of 3D patches of voxels in the reference area under examination and combining the predicting results for each voxel.

19. The method of claim 13, wherein the neighboring locations are in close vicinity of the corresponding location in the reference area under examination.

20. The method of claim 1, wherein a pseudo-CT image comprises a respective MR image of the area under examination having each voxel assigned a respective density value for each of bone, soft tissue and air based on the segmenting step results.

21. The method of claim 1, wherein a pseudo-CT image comprises a respective MR image of the area under examination having each voxel assigned a respective density value for each of bone, soft tissue and air based on the segmenting step results, each respective density value being variable across a given segment type.

22. The method of claim 1, wherein a pseudo-CT image comprises a respective MR image of the area under examination having each voxel assigned a respective density value for each of bone, soft tissue and air based on corresponding patch locations in CT images of a reference area under examination in an MR image in an MR image atlas.

23. The method of claim 1, wherein the characterizing step comprises generating a bias map that compares the attenuation correction maps generated from the pseudo-CT images with the attenuation correction maps generated from the CT images of the reference area under examination.

24. The method of claim 23, wherein the bias map comprises an encoded visualization of the image of the area under examination.

25. The method of claim 1, wherein the characterizing step comprises calculating a distribution of bias values across voxels in a 3D mask image of the reference area under examination produced by the CT images.

* * * * *